INVENTORS
Regis J. Leonard
Gene C. Ulmer

3,664,853
IMPREGNATED FIRED REFRACTORY SHAPE
AND METHOD OF PRODUCING SAME

Regis J. Leonard, Catasauqua, and Gene C. Ulmer, Bethlehem, Pa., assignors to Bethlehem Steel Corporation
Filed Mar. 6, 1970, Ser. No. 17,091
Int. Cl. C04b 35/04, 35/52
U.S. Cl. 106—58                             25 Claims

ABSTRACT OF THE DISCLOSURE

A high-fired basic refractory shape having an apparent porosity of about 10% to about 20%, the open pores of which contain a skeletal-like structure of a material compatible with the host material of the shape. Fine-grain carbon is uniformly distributed on the skeletal-like structure, the walls of the pores and uniformly throughout the shape. A major portion of the open pores have an effective pore diameter of about 7 microns to about 0.5 micron. The shape has increased resistance to penetration and erosion by slags present in steelmaking furnaces and has hot crushing strength equivalent to or better than prepared conventional shapes.

A conventional high-fired basic refractory shape is impregnated with a solution of a substance capable of being treated to form a material compatible with the host material of the shape. The impregnated and treated material forms a skeletal-like structure in the open pores of the shape. The shape is impregnated a second time with a carbonaceous material which upon pyrolysis yields a fine-grained carbon which is uniformly distributed throughout the shape and upon the skeletal-like formation and the walls of the open pores in the shape.

BACKGROUND OF THE INVENTION

The basic oxygen process for manufacturing steel permits rapid production of steel. The shell of the basic oxygen vessels is protected by several layers of insulating and refractory materials, the innermost layer in contact with the molten metal being the working lining. The working lining must have maximum life and minimum downtime due to repairs and replacement to obtain optimum efficiency of the process. The shapes used to fabricate the working lining must have maximum resistance to penetration and erosion by the slags and atmospheres resulting from the steelmaking process and must have an optimum combination of physical and mechanical properties. In order to obtain the optimum combination of physical and mechanical properties, the shape is fired at elevated tempertaures. If the shape is fired at high temperatures to obtain strength the size of the pores increases. If the shape is fired at temperatures to obtain minimum pore size, low hot crushing strength is attained. Therefore, the shape is generaly fired at high temperatures to obtain good hot crushing strength with an attendant large pore size. The shapes is then impregnated with a carboniferous material such as coal tar and/or pitch which will increase the resistance of the shape to penetration and erosion by the slags. After impregnation, the shape is used to form the working lining in the vessel. Upon pyrolysis of the carboniferous material in the shape a relatively coarse carbon is deposited non-uniformly throughout the shape. As a result, the shapes are inadequately protected from penetration and erosion by the slags and atmospheres in the vessel and maximum lining life is not achieved.

It is the primary object of this invention to provide a high-fired basic refractory shape which has improved resistance to penetration by slags present in steelmaking furnaces and improved resistance to erosion by such slags without sacrifice of the hot crushing strength normally found in a conventional high-fired basic refractory shape.

It is another object of this invcention to provide a high-fired basic refractory shape in which the pores constituting the apparent porosity of the shape contain a skeletal-like structure of a material compatible with the host material and a carboniferous material deposited thereon and on the pore walls.

Another object of this invention is to provide a high-fired basic refractory shape in which the pores constituting the apparent porosity of the shape contain a skeletal-like structure of a material compatible with the host material and a carboniferous material which upon pyrolysis will yield a fine-grain carbon deposited uniformly upon the skeletal-like formation within the pores of the shape, the pore walls, and is uniformly distributed throughout the shape.

It is another object of this invention to provide a method for treating a conventional high-fired basic refractory shape whereby the shape will have for the majority of pores constituting the apparent porosity of the shape a decreased effective pore diameter resulting in increased resistance to penetration and erosion by slags present in steelmaking vessels without a loss of crushing strength at elevated temperatures.

SUMMARY OF THE INVENTION

The foregoing objects are attained by a first impregnation of a conventional high-fired basic refractory shape with a solution of a substance which can be treated by conventional means to form a skeletal-like structure of a compound compatible with the host material in the pores of the shape and a second impregnation with a carboniferous material which upon pyrolysis will deposit fine-grain carbon uniformly upon the skeletal-like structure in the pores and upon the walls of the pores in the shape and throughout the shape.

DESCRIPTION OF THE PREFERRED EMBODIMENT

Figure 1:
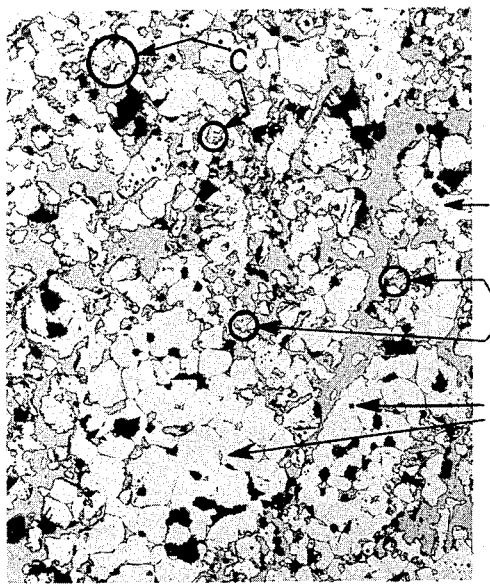
FIG. 1 is a reproduction of a photomicrograph at a magnification of 100 times of a prior art high-fired basic refractory shape which has been impregnated with tar and heated at 2000° F. in carbon monoxide showing the carbon distribution of the shape. The areas of carbon deposited in the shape are identified by the letter "C," and the magnesia grains are identified by the letter, "M." The black areas are voids and the grayish areas are voids which have been filled with plastic used to prepare the specimen for study.

It has been found that a high-fired basic refractory shape having increased resistance to penetration and erosion by slags and atmospheres in steelmaking vessels at no sacrifice to the hot crushing strength at elevated temperatures can be produced from a conventional high-fired basic refractory shape by decreasing the effective pore diameter of a majority of the open pores in the shape while not substantially altering the apparent porosity thereof, and by causing a fine-grain carbon to be deposited uniformly throughout the shape and in the pores of the shape.

The conventional high-fired basic refractory shape is impregnated with a solution of a material which may be treated by conventional means, for example, heating to form a compound compatible with the host material. Several such materials which may be used are magnesium chromate, magnesium sulfate, magnesium nitrate, magnesium chloride, magnesium phosphate, chromic nitrate, phosphoric acid, sulphuric acid, and waste pickling liquor. It is preferred to use magnesium chromate, or waste pickle liquor.

The material to be deposited in the open pores of the basic refractory shape may be dissolved in a fluid vehicle, for example, water, alcohol, acetone, etc., but it is preferred to use water as the vehicle. The solution of the material in the vehicle may be unsaturated, saturated or super-saturated but it is preferred to use an aqueous saturated solution.

The impregnation of the open pores in the conventional high-fired basic refractory shape may be accomplished in any one of several known methods, however it is preferred to place the shape in an appropriate vessel, for example, a vacuum vessel, introduced a sufficient amount of the solution therein, close the vessel and obtain an air-tight seal, and reduce the pressure inside the vessel. The open pores of the shape are generally filled with air. Reducing the pressure in the vessel results in withdrawing the air from the open pores thereby allowing the solution to enter the open pores to occupy the space formerly filled with air. This operation may be done in one stage or several stages depending upon the pressure in the vessel. Low pressures, for example, 1 mm. of mercury favor one stage whereas higher pressures, for example 50 mm. of mercury favor more than one stage. Of course it must be recognized that the viscosity, concentration of solution, and the open porosity of the shape will also affect the ease of impregnation. Any reduced pressure may be used, however practical considerations dictate that the lowest pressure and shortest time required for impregnation should be used.

After impregnation, the vessel is brought to atmospheric pressure, the vessel is opened and the shape treated at a temperature for a time sufficient to dry the shape. The temperature is then raised to convert the impregnated material to a compound, for example, an oxide compatible with the host material. The drying temperature may be about 200° F. to about 500° F. and the conversion temperature may be about 200° F. to about 2400° F. The skeletal-like structure formed in the open pores by the above described procedure does not completely fill the pores but does decrease the volume thereof and does decrease the effective pore diameter of the majority of the pore volume is reduced from about 20–10 microns to between about 7 microns to about 0.5 micron.

The treated shape is now placed in a heated vessel and a carboniferous material, for example, coal tar and/or coal pitch having a desired softening temperature is introduced into the vessel. We have found that a low quinoline insoluble coal tar and/or coal pitch having a softening point of about 120° F. to 160° F. may be used. However, we prefer to use a coal tar and/or coal pitch having a softening point of about 136° F. to 156° F. The softening point is determined by standard ASTM D36–66T ring and ball tests. The vessel is closed and sealed air-tight. The pressure in the vessel is reduced whereby any air which had entered the pores of the shape will be withdrawn therefrom and the coal tar and/or coal pitch will flow into the space originally occupied by the air. As noted in the first impregnation step, practical considerations dictate the pressure to be used in the impregnation step, for example, as low as 1 mm. of mercury or as high as 500 mm. of mercury.

After a time the vessel is brought to atmospheric pressure, opened and the shape removed from the vessel. It is believed that the skeletal-like structure formed in the open pores in the above mentioned steps provides numerous nuclei for the deposition of carbon during the pyrolysis of the coal tar and/or pitch. As a result, the carbon so deposited is fine-grained and substantially uniformly distributed upon the skeletal-like structure and upon the walls of the pores in the shape and uniformly throughout the shape. While the apparent porosity, that is, the open porosity, of the shape may or may not be decreased by the method of the invention, the effective pore diameter of the majority of the open pores is significantly decreased. The majority of the open pores of a conventional high-fired basic refractory shape have an effective diameter of about 20–10 microns, whereas the majority of the open pores of a high-fired basic refractory shape treated by the method of the invention have an effective pore diameter of about 7.0 microns to about 0.5 micron. It is preferred that the majority of the pore volume consists of pores having an effective pore diameter of not more than 4 microns. The combination of the reduced effective pore diameter and the fine-grain carbon well distributed upon the skeletal-like structure and the walls of the pores and uniformly throughout the shape, results in the shape having an increase in resistance to penetration and to erosion by the slags in the vessel, without sacrificing crushing strength at elevated temperatures. A conventional high-fired coal tar and/or pitch impregnated basic refractory shape may have a slag penetration of about 1–12 mm. and slag erosion of 20–35% and a strength of about 2800 p.s.i. when tested at 2800° F., whereas the shape of the invention has a slag penetration of about 0.1–1.0 mm. and slag erosion of 16–30% and a strength of about 3200/3400 p.s.i. when tested at 2800° F.

It will be recognized that the coal tar and/or coal pitch impregnated shape of the invention is used in the impregnated condition to form the working lining of a metallurgical furnace. The elevated temperatures used to refine iron to steel cause pyrolysis of the coal tar and/or coal pitch, i.e. the volatile matter is driven out of the coal tar and/or coal pitch and cause the formation of carbon which is deposited in the shape. Of course, it is possible to heat the impregnated shape to a temperature sufficiently high to drive off the volatile matter in the coal tar and/or coal pitch and to cause the formation of carbon in the shape prior to its use in forming a basic refractory working lining in a metallurgical furnace.

Any conventional high-fired basic refractory shape of the magnesia-type, for example, priclase and mixtures of periclase and dead-burned dolomite may be treated by the method of the invention to produce the shape of the invention. By periclase we mean a material derived from naturally occurring magnesite or synthetically prepared from sea water or brine wells and containing not less than 90% magnesia. By dead-burned dolomite we mean a material derived from naturally occurring dolomite which has been heated to a suitable temperature to convert the carbonates to oxides. A typical composition of a shape made from such materials follows:

Not less than 70% magnesia (MgO)
Not more than 30% lime (CaO)
Not more than 2.0% iron ($Fe_2O_3$)
Not more than 1.0% alumina ($Al_2O_3$)
Not more than 3.0% silica ($SiO_2$)

the remainder incidental impurities.

While a conventional high-fired basic refractory shape having the typical analysis shown above may be treated by the method of the invention to thereby produce a usable product, it is preferred to treat a conventional high-fired basic refractory shape having the following chemical composition:

Not less than 90.0% magnesia (MgO)
Not more than 5.0% lime (CaO)
Not more than 1.5% iron (Fe$_2$O$_3$)
Not more than 1.0% alumina
Not more than 2.5% silica remainder incidental impurities.

A shape of this composition will have the mechanical and physical properties noted below:

Property:
    Apparent porosity (percent) _____ 10.0–20.0.
    Bulk density (grams per cc.) _____ 3.0–3.2.
    Hot crushing strength at 2800° F. (p.s.i) ____ not less than 2000.
    Slag penetration (inches at 2900° F. in open flush slag) _____ 1 to 2.
    Majority of porosity-pores with an effective pore diamettr in microns _____ 20 to 10.

It will be understood that the apparent porosity and the effective pore diameters of the basic refractory shape as noted above were determined after firing and in the as-received condition whereas the porosity of the shape of the invention was determined after impregnation and treatment to obtain the refractory skeletal-like structure of a material compatible with the host material and prior to impregnation with coal tar and/or pitch.

The apparent porosity and effective pore diameters of the basic refractory shape were measured by the method described in an article "Application of Mercury Porosimetry to Refractory Materials" by G. C. Ulmer and W. J. Smothers in the Bulletin of the American Ceramic Society, July 1967, vol. 46, pp. 649–652. Therefore, the effective pore diameter of the pores in the shape may be defined as the size of the pore opening which will be penetrated by mercury and calculated as described in "Mercury Porosimetry Correction" by G. C. Ulmer and W. J. Smothers, Bulletin American Ceramic Society, vol. 46, #11, November 1967, p. 1097, in the above mentioned article that is $$D = \frac{-4T \cos \theta}{P}$$

where

D=effective diameter of the smallest pore penetrated
T=the surface tension of the liquid
θ=wetting or contact angle of the liquid-solid interface
P=absolute pressure.

The resistance to slag penetration was determined by a method described in an article "Slag Attack in Carbon-Bearing Basic Refractories" by R. H. Herron, C. R. Beechan, and R. C. Padfield, Bulletin of the American Ceramic Society, December, 1967, vol. 46, pages 1163–1168.

In this specification and claims, wherever percentages are referred to, such percentages are by weight unless otherwise noted.

Figure 2:
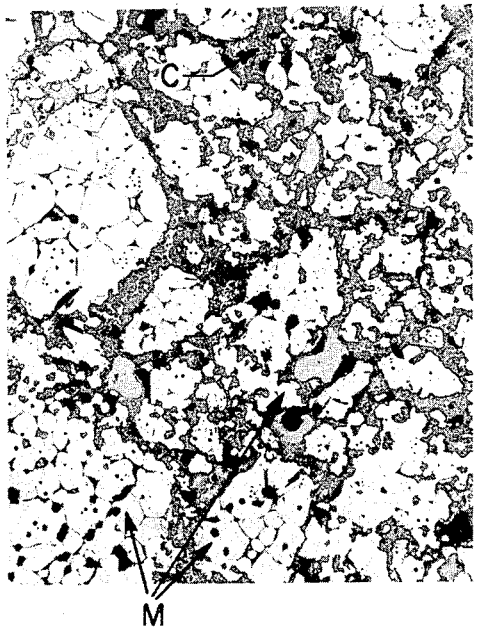
FIG. 2 is a reproduction of a photomicrograph at a magnification of 100 times of a conventional high-fired basic refractory shape which has been treated by the method of the invention and heated at 2000° F. in carbon monoxide showing the carbon distribution of the shape.
Figure 3:
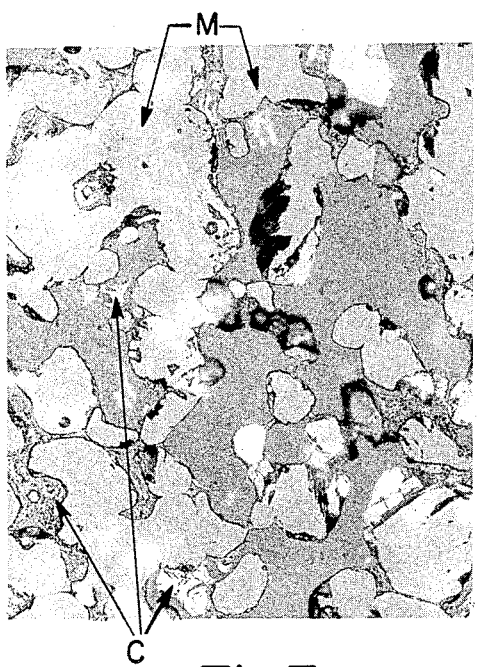
FIG. 3 is a reproduction of a photomicrograph at a magnification of 500 times of the shape in FIG. 1 showing the microstructure in the shape.
Figure 4:
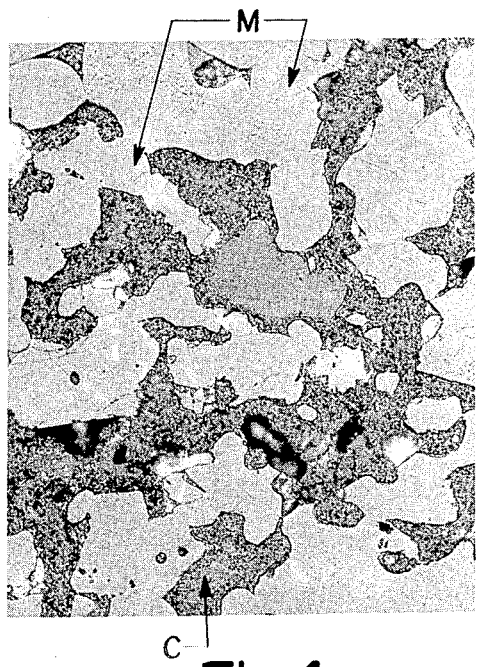
FIG. 4 is a reproduction of a photomicrograph at a magnification of 500 times of the shape in FIG. 2 showing the microstructure in the shape.

In a specific example of the invention, conventional high-fired basic refractory shapes were treated according to the method of the invention and where compared to conventional high-fired basic refractory shapes which were not treated according to the method of the invention but which were pitch impregnated and cooked. All the basic refractory shapes were made from the same refractory mix and had the following chemical composition:

MgO—92%, CaO—3.2%, SiO$_2$—1.4%, Al$_2$O$_3$—0.80%, Fe$_2$O$_3$—0.30%, TiO$_2$—0.25%; and less than 0.1% Cr$_2$O$_3$ the remainder being incidental impurities. In the as-received condition the conventional high-fired basic refractory shapes had an average apparent porosity of 16.4% and a specific volume of the porosity consisting of pores having an effective diameter not greater than 7 microns was 16.5%. Several of the shapes were treated by the method of the invention as described below. The shapes were placed in a chamber which was evacuated to a pressure of 1.0 mm. Hg and held at that pressure for 30 minutes before admitting a saturated solution of magnesium chromate in water. The shapes were entirely submerged in the solution and held at the same pressure of 1.0 mm. Hg for 10 minutes. The pressure in the chamber was then increased to atmospheric pressure. The shapes were removed from the vessel and placed in a dryer at 250° F. to evaporate the water inside the shapes and cause the crystallization of a hydrated form of magnesium chromate (MgCrO$_4$·5H$_2$O). The dried specimens were then placed in a kiln and heated to 1800° F. for 2 hours to substantially convert all of the magnesium chromate pentahydrate to a mixture of magnesium oxide (MgO) and magnesium chromite (MgCr$_2$O$_4$) which deposited as a skeletal-like structure in the pores. The deposited MgO and MgCr$_2$O$_4$ amounted to 2.04% increase in the sample weight. At this stage of the treatment, the specific volume of porosity consisting of pores having an effective diameter of not more than 7 microns was 79.5%. The shapes were then placed in a vessel and impregnated with a 149° F. softening point coal pitch using a Stokes impregnating unit and standard procedure. Several impregnated shapes were then heated to 2000° F. for 2 hours in a reducing atmosphere to convert the pitch to coke for testing purposes. The average apparent porosity was found to be 9.4% with a carbon retention of 1.5%. The hot crushing strength of the shapes was 3400 p.s.i. when tested at 2800° F. As shown in FIGS. 2 and 4, microscopic examination of the shapes revealed that fine-grain carbon was well distributed in the pores of the shapes and uniformly throughout the shapes. These figures are compared to FIGS. 1 and 3 of a conventional high-fired basic refractory shape not treated by the invention and described below. Note that the carbon particles deposited in these shapes are relatively large, and unevenly distributed in the pores and throughout the shape. Conventional high-fired basic refractory shapes were impregnated with coal pitch in the same procedure as described above. The apparent porosity of these shapes was 11.7% and a carbon retention of 1.7%. The strength at elevated temperatures of the shapes was 2800 p.s.i. when tested at 2800° F.

The shapes treated according to the invention and coal pitch impregnated were tested to determine their resistance to slag penetration and slag erosion. The slag used was one of a composition comparable to those found in steelmaking vessels, for example, open hearth flush slag and had the following chemical analysis:

26.0% SiO$_2$, 1.7% Al$_2$O$_3$, 22.3% CaO, 6.5% MgO, 1.1% TiO$_2$, 26.8% FeO, 6.2% MnO, 1.0% P$_2$O$_5$ and remainder incidental amounts of materials usually found in slags of this type.

The test was conducted at 2950° F. Pellets of the slag weighing 0.154 pound each were placed on the shape at 5 minute intervals until each specimen had been exposed to a total of 5 pounds of molten slag. Conventional high-fired basic refractory shapes which were coal pitch impregnated in a manner similar to that of the shapes as treated according to this invention were compared to the above shapes. The results of the test are listed below in Table 1.

TABLE 1

|  | Residual carbon (Leco wt. percent) | Erosion percent | Depth of slag penetration, mm. |
|---|---|---|---|
| Shapes treated according to the invention | 1.5 | 26.5 | 0.25 |
| Shapes untreated-coal pitch impregnated | 1.7 | 35.5 | 3.5 |

An analysis of the pore structure after the slag test was made on slag-free portions of the shapes prepared according to this invention. The shapes prepared according to the method of this invention had an average apparent porosity of 9.4% and the effective diameter of the majority of the porosity consisted of pores having an effective diameter of less than 1 micron.

In another specific example several conventional high-fired basic refractory shapes having the same chemical composition and physical and mechanical properties of the shapes in the above specific example were treated according to the method of the invention as noted above except the shapes were impregnated with waste pickle liquor having the following chemical composition:

Free acids—1.0%
Dried residue—32.9%
Composition of residue—99% $FeSO_4 \cdot H_2O$, and remainder incidental materials normally found in pickling acids.

The conventional high-fired basic refractory shapes were the same as the first specific example. After treatment, the shapes were found to have a hot crushing strength of 2600 pounds per square inch when tested at 2800° F., an apparent porosity of 14.8% and the specific volume of porosity consisting of pores having an effective pore diameter of not more than 7 microns was 66.0%.

We claim:

1. A porous high-fired basic refractory shape containing a skeletal-like refractory structure compatible with the host material within the open pores and carbonaceous material on the surface of said pores and said skeletal-like refractory structure and throughout the shape.

2. A porous high-fired basic refractory shape containing a skeletal-like refractory structure compatible with the host material within the open pores and a layer of fine grain carbon on the surfaces of said pores and said skeletal-like refractory structure and throughout the shape.

3. A high-fired basic refractory shape having an apparent porosity of about 10% to about 20% containing not less than about 70% MgO, not more than about 30% CaO, not more than about 2.0% iron oxide, not more than about 1.0% $Al_2O_3$, not more than about 3.0% $SiO_2$, the remainder incidental impurities, said shape comprising a skeletal-like refractory structure compatible with the host material in the pores of the shape and a carboniferous material impregnated therein, a majority of the pore volume consisting of pores with an effective pore diameter of about 7 microns to about 0.5 micron.

4. A high-fired basic refractory shape as claimed in claim 3 wherein fine grain carbon is uniformly distributed throughout the shape.

5. A high-fired basic refractory shape as claimed in claim 3 in which a majority of the pore volume consists of pores with an effective pore diameter of not more than about 4 microns.

6. A high-fired basic refractory shape as claimed in claim 5 in which fine grain carbon is uniformly distributed throughout the shape.

7. A high-fired basic refractory shape having an apparent porosity of about 10% to about 20% containing not less than about 90% MgO, not more than about 5.0% CaO, not more than about 1.5% $Fe_2O_3$, not more than about 1.0% alumina, not more than about 2.5% silica, the remainder incidental impurities, said shape comprising a skeletal-like refractory structure compatible with the host material in the pores of the shape and a carboniferous material impregnated throughout, a majority of the pore volume consisting of pores with an effective pore diameter of about 7 microns to about 0.5 microns.

8. A high-fired basic refractory shape as claimed in claim 7 wherein fine grain carbon is uniformly distributed throughout the shape.

9. A high-fired basic refractory shape as claimed in claim 7 wherein the majority of the pore volume consists of pores with an effective pore diameter of not more than about 4 microns.

10. A high-fired basic refractory shape as claimed in claim 9 wherein fine grain carbon is uniformly distributed throughout the shape.

11. A method for manufacturing a porous high-fired basic refractory shape having an apparent porosity of about 10% to about 20%, and a majority of the pore volume having an effective pore diameter of about 7 microns to about 0.5 micron, said method comprising:
  (a) subjecting the open pores of said shape to a first impregnation with a solution of a material adapted to be treated to form a refractory compound compatible with the host material of said porous refractory shape,
  (b) drying the impregnated shape,
  (c) treating the impregnated shape at a temperature for a time to convert the material impregnated within the open pores in step (a) to form a skeletal-like refractory structure in said open pores of said shape, and
  (d) subjecting said shape of step (c) to a second impregnation with a carboniferous material.

12. The method of claim 11 in which the shape is basic.

13. The method of claim 12 in which the carboniferous material is at least one material taken from the group consisting of coal tar and coal pitch.

14. The method of claim 12 in which the carboniferous material has a softening point of about 120° F. to about 160° F. as determined by ASTM D–36–66T ring and ball test.

15. The method of claim 13 with a further step of subjecting the impregnated shape of step (d) to a temperature for a time sufficient to pyrolyze the impregnated carboniferous material.

16. The method of claim 12 in which the material impregnated in the pores of the shape in step (a) is magnesium chromate.

17. The method of claim 12 in which the material impregnated in the pores of the shape in step (a) is waste pickle liquor.

18. The method of claim 12 in which the composition of the basic refractory shape is not less than about 70% MgO, not more than about 30% CaO, not more than about 2.0% iron oxide, not more than about 1.5% $Al_2O_3$, not more than about 3.0% $SiO_2$, the remainder incidental impurities.

19. The method of claim 12 in which a majority of the pore volume consisting of pores with an effective pore diameter of not more than about 4 microns.

20. The method of claim 19 in which the carboniferous material is at least one material taken from the group consisting of coal tar and coal pitch.

21. The method of claim 20 with a further step of subjecting the impregnated shape of step (d) to a temperature for a time sufficient to pyrolyze the impregnated carboniferous material.

22. The method of claim 12 in which the composition of the basic refractory shape is not less than about 90% MgO, not more than about 5% CaO, not more than about 1.5% $Fe_2O_3$, not more than about 1.0% $Al_2O_3$, not more than about 2.5% $SiO_2$, the remainder incidental impurities.

23. The method of claim 22 in which the carboniferous material is at least one material taken from the group consisting of coal tar and coal pitch.

24. The method of claim 23 in which the carboniferous material has a softening point of about 120° F. to about 160° F. as determined by ASTM D-36-66T ring and ball test.

25. The method of claim 24 in which the shape is subjected to a temperature for a time sufficient to pyrolyze the impregnated carboniferous material.

References Cited

UNITED STATES PATENTS

| 2,792,214 | 5/1957 | Eusner et al. | 106—58 |
| 2,805,174 | 9/1957 | Veale | 117—113 |
| 3,106,475 | 10/1963 | Davies et al. | 106—58 |
| 3,330,676 | 7/1967 | Ellsiepen et al. | 106—56 |

JAMES E. POER, Primary Examiner

U.S. Cl. X.R.

106—58